United States Patent Office 3,468,804
Patented Sept. 23, 1969

3,468,804
SILVER CLEANING COMPOSITION
Kenneth E. Perry, Wellesley, Mass., assignor to Winfield Brooks Company, Inc., Woburn, Mass., a corporation of Massachusetts
No Drawing. Filed Mar. 13, 1964, Ser. No. 351,840
Int. Cl. C23g 1/02; C11d 7/50
U.S. Cl. 252—143       7 Claims

ABSTRACT OF THE DISCLOSURE

A silver cleaning composition consisting essentially of water, sulfuric acid, thiourea and a substantially water insoluble, cationic fatty aliphatic polyamine having a terminal fatty aliphatic group of between 8 and 20 carbon atoms attached to an amino nitrogen. A preferred polyamine is

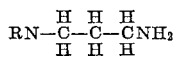

where R is the aforesaid aliphatic group. A substantially water insoluble amide or salt of the polyamine may be used in place of the polyamine. However, the polyamine is preferred.

---

The present invention relates to a silver cleaning composition and, more particularly, to such a composition containing an inorganic, polybasic mineral acid, such as sulfuric acid, and thiourea.

Silver tarnish is primarily silver sulfide formed by reaction of the silver surface with sulphur compounds in the atmosphere and in foods and other materials coming in contact with such surface, e.g. $H_2S$.

The silver cleaning compositions of the type referred to above have the advantages that (1) the acid and thiourea react with the silver sulfide to form $H_2S$ and regenerate the silver so that substantial amounts of silver are not removed and (2) they can be used as a dip, cleaning being accomplished merely by dipping the silver into the composition.

However, such compositions have the serious disadvantage that the newly regenerated silver surface is highly reactive and reacts with hydrogen sulfide being formed in the cleaning composition to form silver sulfide tarnish even as the silver is removed from the composition to thereby limit the brightness and lustre which can be achieved. Furthermore, the highly reactive freshly regenerated silver surface tarnishes more rapidly upon exposure to the atmosphere after cleaning to thereby necessitate more frequent cleaning with only mediocre results.

Furthermore, in order to achieve adequate cleaning in relatively short times, high concentrations of acid, e.g. 10%, are generally required which concentrations are harmful to the average skin.

Because of these disadvantages, this type of silver cleaner has not been widely adopted commercially in spite of the fact that it can be used as a dip in which the silver need only be dipped to clean it, thereby eliminating the necessity of tedious polishing, and in spite of the fact that it does not remove silver.

Instead, silver cleaning compositions containing an abrasive and a soap are being used in the form of pastes and viscous liquids, which are extremely difficult and tedious to use. Such pastes are rubbed on and rubbed off to physically remove the tarnish by abrasive action. It is extremely difficult and hard on the fingers to remove the paste from, and to effectively clean, small crevices which are present in many silver designs. Also, as aforesaid, the abrasive acts to remove the silver sulfide tarnish, as such, so that silver is removed by each cleaning.

The present invention overcomes the above mentioned problems inherent in polybasic mineral acid—thiourea silver-cleaning compositions by incorporating therein a non-toxic, cationic film forming compound which, through its cationic activity, is plated out in the form of a protective film or coating over the newly generated anionic silver surface resulting from reaction of the acid and thiourea with the silver sulfide just as soon as it (the freshly generated silver surface) is formed. The protective film protects the bright, highly lustrous, freshly generated silver surface from reaction (1) with $H_2S$ in the composition (formed by reaction of the acid and thiourea with the silver sulfide tarnish), and (2) with sulphur compounds in the atmosphere after the silver has been cleaned. Thus, it preserves the high lustre and brightness of the newly generated silver surface and makes possible the achievement of a remarkably greater lustre and brightness than it has been possible to achieve heretofore except by the use of cyanide (solutions of alkali metal cyanides), which is so highly toxic in nature that silver cleaners incorporating it are not commercially feasible for home and restaurant use. Not only does the cationic film forming compound of the present invention provide a greater lustre and brightness than has heretofore been achievable without cyanide, but because the film formed thereby protects the freshly generated silver from the atmosphere after the cleaning operation, such high lustre and brightness is preserved for a relatively long time after cleaning to thereby reduce the frequency of cleaning required.

An important advantage of the cleaning composition of the present invention is that it can be used as a dip. Consequently, it is necessary only to dip the tarnished silver into the composition for a moment to achieve a high and lasting silver lustre and brightness.

This will be appreciated by anyone who has had to clean silver with presently commercially available abrasive pastes, which is a time consuming and tedious task resulting in aching fingers.

Another important advantage of the cationic film forming compound of the present invention is that it reduces the concentration of acid (generally sulfuric acid) usually required from about 10%, which concentration is quite harsh on the normal skin even with short contact times, to about 2% and less, which can be tolerated with no harmful effects for a relatively long time by the average skin. Thus, the composition of the present invention can be handled without gloves by persons with normal skin for a relatively long time with no harmful effects.

The cationic film forming compound of the present invention is a nitrogen compound of the group consisting of (1) an organic aliphatic amine, (2) an amide thereof with an organic carboxylic acid, (3) a quaternary ammonium salt thereof and (4) a salt thereof with an organic carboxylic acid or an inorganic mineral acid, such compound having a fatty aliphatic group of at least six carbons, and preferably at least eight carbons (8 to 20 carbons are the most preferred), and being stable with respect to the inorganic polybasic mineral acid and the thiourea. In the case of a salt of the amine with an inorganic mineral acid, which is not a preferred embodiment, such salt can be formed in situ by reaction of the amine with part of the polybasic mineral acid. This is the only exception to the above statement that the cationic film forming compound should be stable with respect to the polybasic mineral acid and thiourea. In such case the amine is stable in that the amino group and the fatty aliphatic group remain in the same molecule.

The fatty aliphatic group is an end or terminal group in the molecule and is attached to an amino nitrogen atom.

Preferred fatty aliphatic amines (primary, secondary and tertiary) containing the fatty aliphatic group or groups as referred to above are those which are stable and chemically inert with respect to the polybasic mineral acid, e.g., sulfuric, and thiourea and which are strongly cationic. Typical of such amines are fatty aliphatic polyamines, particularly polyamines having a secondary and a primary amino group.

One type of such amine which has proved the most preferable is that having the formula:

$$R_{1H}N\text{—}RNH_2$$

where $R_1+R$ are both aliphatic groups and $R_1$ is a fatty aliphatic group having at least six, and preferably at least eight, carbon atoms, e.g., lauric, coconut, soya, tallow, etc. Preferably, R has three carbons to provide the formula:

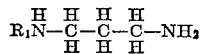

or N-fatty alkyl, 1,3, diamino propane. These compounds are sold under the trade name "Duomeens." Duomeen C is N-coconut trimethylene diamine. Duomeen O is N-oleyl trimethylene diamine. Duomeen S is N-soya trimethylene diamine. Duomeen T is tallow trimethylene diamine. Duomeen 12 is N-lauryl trimethylene diamine. See "Duomeens," Armour Chemical Division (1956), pages 1–4. They are water insoluble and chemically inert with respect to polybasic mineral acids such as sulfuric acid and with respect to thiourea. They are strong bases and have two polar amino groups on each molecule which make them strongly cationic. It is believed that these cationic amino groups are attracted, and bond, to the anionic freshly generated silver surface to cause the compound to plate out on such surface in the form of a protective coating or film provided by the fatty aliphatic group or groups.

Cationic amides of aliphatic amines and aliphatic carboxylic acids, particularly poly (di and tri) carboxylic acids, such as adipic, oxalic, succinic, citric, tartaric, etc., can be used as the cationic film forming compounds of the present invention, so long as the amide contains the fatty aliphatic group which is not separated or split off from the amide group by reaction with the polybasic acid and the thiourea. However, they are not as effective as the amines themselves. Preferred amides are those formed from fatty aliphatic amines, particularly the preferred fatty aliphatic amines referred to above, in which case the fatty aliphatic group or groups is supplied by the amine. Such amides are described in "Duomeens," Armour Chemical Division (1956), page 2. Condensation to form the amide occurs at both the primary and secondary amine groupings in the case of the amides of the N-fatty alkyl diamines.

Cationic quaternary ammonium salts of aliphatic amines formed by reaction with the alkyl (e.g., 1 to 20 carbon atoms) halides, e.g., alkyl chloride, can be used as the cationic film forming compounds so long as such quaternary ammonium compound contains the fatty aliphatic group, which is not separated from the quaternary ammonium group by the polybasic acid and the thiourea. Such quaternary ammonium salts are described in "Duomeens," Armour Chemical Division, (1956), page 2. However, they are not as effective as the amines. Preferred quaternary ammonium compounds are those formed from fatty aliphatic amines, particularly the preferred fatty aliphatic amines referred to above, in which case the fatty aliphatic group or groups is supplied by the amine. However, such group can be supplied as the alkyl group in the alkyl chloride. Addition to form the quaternary ammonium compounds occurs at both the secondary and primary amine groupings in the case of the N-alkyl diamines.

Cationic mono and poly salts of fatty aliphatic amines with mineral acids, preferably monobasic mineral acids, and of aliphatic amines with organic carboxylic acids, preferably aliphatic monocarboxylic acids, as for example, oleic acid, acetic acid, lactic acid, stearic acid, etc., can be used as the cationic film forming compounds of the present invention so long as such salts contain the fatty aliphatic group which is not separated from the amino nitrogen group by reaction with the polybasic acid and thiourea. However, they are not as effective as the amines, as such, and they have the disadvantage of being substantially more water soluble. Preferred salts are those of fatty aliphatic amines containing the aliphatic group or groups, particularly the preferred fatty aliphatic amines referred to above. The mono and dioleates of

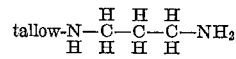

are sold under the trade name Duomeen TMO and Duomeen TDO, respectively. Duomeen TMO is N-tallow trimethylene diamine monooleate, Duomeen TDO is N-tallow trimethylene diamine dioleate and Duomeen CA–50 is the adipic acid salt of N-coconut trimethylene diamine (Duomeen C).

Preferred nitrogen film forming compounds are those which are substantially water insoluble so that rinsing will not remove the film or coating which plates out over the newly generated silver surface. That is one reason why the more soluble salts, e.g., acetate, are not as desirable as the amines themselves.

The nitrogen film forming compounds may be liquids or solids. For example, N-coconut, 1,3 diamino propane is a liquid, N-lauryl and N-soya 1,3 diamino propane are fluid pastes and tallow-1,3 diamino propane is a soft paste.

The concentration of nitrogen film forming compound may vary from just a trace to about 5 or 10%, or more, by weight of the composition. Preferably, it is substantially less than the concentration of polybasic acid for reasons to be described hereinafter. Concentrations between about .05% and 1.0% or 2.0% by weight have proved highly effective with polybasic acid concentrations between about 1 and 5% by weight of the composition. The upper limit is dictated only by the maximum amount which can be kept in fluid dispersion, which is usually substantially less than the amount of sulfuric acid and/or thiourea present. The film formed by the film forming compound over the newly generated silver surface is exceedingly thin so that very small amounts are effective for coating an exceedingly large total amount of silver surface area before the supply is exhausted. Thus, if the composition is to be used only once for cleaning a small amount of silver surface, only a trace is necessary but if it is to be used over and over again to clean a large total amount of silver surface, as is required for commercial acceptance, more should be present to supply the required amount of film or coating to cover such large total surface before becoming exhausted. The amount of film forming compound depends to a great extent on the amount of sulfuric acid and thiourea present since, obviously, there is no point to having film forming compound present after the sulfuric acid and thiourea have been exhausted. By the same token, there is no point in having sulfuric acid and thiourea present after the film forming compound has been exhausted. Thus, it may be stated that the optimum amount of film forming compound is that amount which is sufficient to form a film over the total silver surface which the sulfuric acid and thiourea have the capacity to generate. However, this is a matter of economy rather than criticality to the invention and, in practice, it is not necessary or practical to achieve such a fine balance. Only a relatively small amount of film forming compound is needed to coat a given area of freshly generated silver in comparison to the amount of sulfuric acid and thiourea required to generate such area so that the amount of such compound in the cleaning composition is preferably only a small fraction of the amount of sulfuric acid and/or thiourea even when more than that required is present. More can be used but it is pointless to increase the cost by adding excessive amounts more than are necessary. It has been found that a concentration of between about 0.05 to 0.5% by weight is more than ample for compositions containing sulfuric acid concentrations of from 1 to 3% and thiourea concentrations ranging from 1 to 6%. In fact, it has been found that compositions with these amounts of sulfuric acid, thiourea and film forming compound are exhausted by adhering to the silver surfaces dipped and removed therefrom before the chemicals are exhausted.

EXAMPLE 1

The following composition was prepared:

| Ingredient: | Percent by wt. of composition |
| --- | --- |
| Water | 89.0 |
| Thiourea | 5.0 |
| Triton X-100 [1] | 1.0 |
| 50% aqueous solution of sulfuric acid (2% $H_2SO_4$ 2% $H_2O$) | 4.0 |
| Methanol | 0.9 |
| Duomeen C (coconut-N, 1,3 diamino propane) | 0.1 |

[1] Trade name for Rohm & Haas Co.'s isooctyl phenyl polyethoxy ethanol non-ionic surfactant.

The thiourea powder was dissolved in the warm water. The water need not be warm but when it is the thiourea dissolves more quickly. The 50% sulfuric acid solution was then added with agitation followed by the Triton X-100. The Duomeen dissolved in the methanol was then added with agitation to form the composition.

The only purpose of the methanol is to facilitate dispersion of the water insoluble Duomeen. Any alkyl alcohol, or other solvent in which the Duomeen is soluble can be used. Furthermore, by the use of elevated temperatures and strong agitation, the Duomeen may be dispersed adequately without the use of any solvent. If the agitation is sufficiently strong, the Duomeen can be dispersed in the cold solution. Some cationic film forming nitrogen compounds of the invention are more dispersible in water than others. In any event, when the cationic film forming compound is added cold, dissolving it first in an alcohol or some other solvent facilitates dispersion. However, as aforesaid, such solvent is not required.

Where the film forming agent is a solid, as for example Duomeen T (N-tallow, 1,3 diamino propane), it can be dissolved in methanol or some other solvent before being added or it can be added in melted form (without a solvent) at an elevated temperature, i.e. above its melting point.

The purpose of the wetting agent (Triton X-100) is to provide a stable dispersion of the water insoluble Duomeen in water, i.e., hold the Duomeen in stable suspension. Where a more soluble cationic film forming agent is used, such as a salt of the Duomeen, it may be dispersed adequately without the wetting agent or lesser amounts thereof.

Where a wetting agent is used, it must be non-ionic or cationic and chemically inert with respect to the other ingredients. Non-ionic wetting agents are preferred. Thus, any non-ionic or cationic wetting agent or detergent can be used which is chemically inert or stable with respect to the other ingredients, e.g. the polybasic acid and thiourea. The many wetting agents which fulfill these requirements will be obvious to persons skilled in the art so that there is no point to listing them.

The concentration of wetting agent, when it is used, is not critical and varies according to the film forming compound used, enough being used to form a stable dispersion of the amine in the sulfuric acid and thiourea solution. More than that is not required although more can be used if desired. As aforesaid, no wetting agent at all is required with certain of the more soluble but less preferred film forming compounds.

Instead of sulfuric acid, other strong polybasic mineral acids can be used, such as sulfamic acid or phosphoric acid, which in admixture with thiourea, react with silver sulfide to form silver.

If desired, anti-foam agents, such as DC Antifoam A, perfumes, such as Fritzche Bros. #21515, and coloring dyes, such as Anthraquinone Blue Dye, may be added to the composition to prevent excessive foaming, to provide a pleasant odor and to provide coloring, respectively. Also, abrasives, such as Johns-Manville's Snow-Floss (aluminum silicate) and diatomaceous earth, and emollients, such as lanolin, Carbowax or similar materials, can be added. However, in every case, agents which are chemically inert to the sulfuric acid, thiourea and cationic amine should be used. The proper agents which have these properties will be obvious to those skilled in the art.

Half of a piece of tarnished silver was dipped into the composition of Example 1 for about 30 seconds and then removed, rinsed with water and dried. It was observed that the tarnish disappeared almost instantaneously when the silver was dipped and the silver took on a remarkably high lustre and brightness. The silver retained this high lustre and brightness on standing in the atmosphere over a relatively long period of time after cleaning.

The same procedure was followed with the other half of the silver using the same cleaning composition without the Duomeen. The lustre and brightness achieved by dipping this half of the silver was markedly less than the first half, and the silver noticeably started to tarnish again soon after cleaning. Within a short time, it was as bad as it was originally while the first half retained its high lustre and brightness.

It is believed that the poor brightness of the second half was due to reaction of the highly reactive newly generated silver surface (generated by reaction of silver sulfide tarnish with the sulfuric acid and thiourea) with the $H_2S$ in the composition (generated by reaction of sulfuric acid and thiourea with the silver sulfide tarnish). It is believed that this second half of the silver commenced to noticeably tarnish soon after it was cleaned because the newly generated silver surface was highly reactive to sulphur compounds in the air. It is known that newly generated raw silver is highly reactive.

On the other hand, it is believed that the cationic fatty amine (Duomeen) in the composition of the invention plated out in the form of a protective film or coating in situ over the newly generated silver surface just as soon as such new silver surface, which is anionic, was formed. It did this by virtue of its cationic nature, attributable to the amino groups, and the anionic nature of the new silver. The fatty aliphatic grouping of the amine film coated over the silver surface protected the silver against contact with $H_2S$ in the composition during dipping and with sulphur compounds in the air after dipping. Since the amine is water insoluble, the coating was not removed during rinsing. Since the newly generated silver has a high brightness, lustre and shine, which is preserved by the film, the first half of the piece of silver had a high brightness, lustre and shine.

The low sulfuric acid concentration of the composition of the example did not irritate the hands. The same with respect to the low amine concentration.

EXAMPLE 2

The same procedure followed in treating the second half of the silver in Example 1 was followed with another piece of tarnished silver using the same composition used for such second half except that the sulfuric acid concentration was increased to 10%. The results were about the same and the composition was irritating to the skin on contact.

EXAMPLE 3

The same procedure followed in treating the first half of the tarnished silver in Example 1 was followed with another piece of tarnished silver except the sulfuric acid concentration was increased to 10%. The results were about the same.

EXAMPLE 4

The same procedure followed in treating the second half of the tarnished silver in Example 1 was followed with another piece of tarnished silver with the same mediocre results. However, following such procedure, this piece was then dipped into the same composition in which the first half of Example 1 was dipped. The instantaneous increase in brightness and lustre was marked.

EXAMPLE 5

A composition like that of Example 1 was prepared except for the use of an amide of Duomeen C (N-lauric 1,3 diamino propane) and adipic acid instead of Duomeen C. This composition did as good a job as the composition of Example 1 (containing Duomeen C) in cleaning tarnished silver but not in preserving the lustre and brightness after cleaning because it is more water soluble and the film is partially removed during rinsing.

EXAMPLE 6

A composition like that of Example 1 was prepared except for the use of tallow trimethyl ammonium chloride (made from tallow chloride and trimethyl amine) instead of Duomeen C. This composition had about the same effectiveness as the composition of Example 5. It did as good a job of cleaning as in Example 5 and was no better with respect to preventing subsequent retarnishing because it, like the amide of Example 5, is also more water soluble than Duomeen C.

EXAMPLE 7

A composition like that of Example 1 was prepared except that a dioleate of Duomeen C was added without the use of methanol, instead of Duomeen C. This composition had about the same effectiveness as Example 6 so far as cleaning was concerned but was not as effective in preserving the lustre and brightness after cleaning.

The composition of the present invention, as illustrated in the examples, can be reused over and over again until the film forming compound and/or the sulfuric acid and thiourea are exhausted, and hence it is inexpensive to use as compared to abrasive pastes now on the market. As aforesaid, the protective film is very thin so that only a very small amount (even a trace amount) goes a long way.

The concentration of sulfuric acid and thiourea may be varied over a wide range. The minimum amount is dictated only by the amount required for reaction with the silver sulfide or tarnish on the silver. It is highly desirable to keep the concentration relatively low so that the composition will not be harmful to the hands. On the other hand, from a commercial standpoint, it is desirable to have a sufficient amount to clean a relatively large total silver surface area and to achieve the desired rate of reaction which is usually rapid. A sulfuric acid concentration of from about 1 to 5%, by weight of composition, is preferred. Although the benefits of the invention are achieved with higher concentrations they are not as desirable because of their harmful effects on the skin and on other non-acid resistant materials with which they come in contact. The 2% concentration of the Example 1 is sufficient to last a housewife a long time.

Preferably, the percent by weight of thiourea is greater than that of the sulfuric acid but it need not be. A preferred concentration of thiourea is between 1 and 10% by weight of the composition. Good results have been achieved when the thiourea concentration is about twice as great as the sulfuric acid. However, so far as the benefits of the invention are concerned, the concentration of neither the sulfuric acid nor the thiourea is critical, keeping in mind, however, that one of the advantages of the invention is that it permits the use of relatively low concentrations of sulfuric acid and thiourea. The ranges of concentration of acid and thiourea for reaction with silver sulfide are known and any concentration within these ranges can be used.

Instead of water, other inert carriers can be used.

Also, mixtures of different kinds of film forming compounds can be used to accomplish certain specific results. For example, the quaternary ammonium compound of Example 6 is desirable because of its emollient effect on the skin but it has the disadvantage of being too water soluble for preservation of lustre. However, Duomeen C is excellent for preservation of lustre so that in combination a highly desirable product can be formulated.

It is not intended that the invention be limited to the above examples or by any theoretical explanation set forth above but only to those compositions covered by the following claims.

I claim:

1. In a silver cleaning composition consisting essentially of from 1 to 10% by weight of an inorganic polybasic acid, from 1 to 20% by weight thiourea, a wetting agent selected from the group consisting of non-ionic and cationic wetting agents, and between a trace and about 10% by weight of an organic, cationic, film-forming, substantially water insoluble fatty aliphatic amine having a terminal fatty aliphatic group of between six and twenty carbon atoms attached to an amino nitrogen, the amount of said wetting agent being sufficient to form a substantially stable dispersion of said amine in said composition.

2. In a silver cleaning composition consisting essentially of from 1 to 10% by weight of an inorganic polybasic acid, from 1 to 20% by weight thiourea, a wetting agent selected from the group consisting of non-ionic and cationic wetting agents, and between a trace and about 10% by weight of an organic, cationic, film-forming, substantially water insoluble, fatty aliphatic polyamine having a terminal fatty aliphatic group of between six and twenty carbon atoms attached to an amino nitrogen, the amount of said wetting agent being sufficient to form a substantially stable dispersion of said polyamine in said composition.

3. A silver cleaning composition according to claim 2, said polyamine being a diamine having the formula:

$$R_1NRNH_2$$

where $R_1$ represents said fatty aliphatic group and R represents a saturated lower aliphatic hydrocarbon group.

4. A silver cleaning composition according to claim 3, in which R comprises:

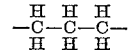

5. A silver cleaning composition according to claim 4, said diamine being selected from the group consisting of N-lauryl, N-coconut, N-soya and N-tallow 1,3 diamino propane.

6. A composition according to claim 5, said diamine being N-coconut 1,3 diamino propane.

7. A silver cleaning composition according to claim 3, said inorganic polybasic acid being sulfuric acid, said composition also including water, the amount of said sulfuric acid being between 1 and 5% by weight of the composition and the amount of thiourea being between 1% and 10% by weight of the composition.

(References on following page)

References Cited

UNITED STATES PATENTS

| | | | |
|---|---|---|---|
| 2,475,186 | 7/1949 | Kamlet | 252—390 XR |
| 2,505,785 | 5/1950 | Moore | 252—148 XR |
| 2,628,199 | 2/1953 | Lowenheim | 252—149 XR |

FOREIGN PATENTS 774,521  5/1957  Great Britain.

OTHER REFERENCES

Bennett, The Chemical Formulary, vol. 11 (1961), Chem. Pub. Co., Inc. p. 200 relied on.

Duomeens, Armour Chemical Division (1956), pages 1–4 relied on.

LEON D. ROSDOL, Primary Examiner

W. SCHULZ, Assistant Examiner

U.S. Cl. X.R.

21—2.5; 106—14; 134—4, 41; 148—6.14; 252—148, 390